United States Patent Office 3,155,900
Patented Nov. 3, 1964

3,155,900
MEASURING SYSTEM FOR DETERMINING THE MASS OF A DIELECTRIC MATERIAL UTILIZING A CAPACITIVE PROBE AT TWO FREQUENCIES
Albert F. G. Hanken, Columbus, Ohio, assignor to Industrial Nucleonics Corporation, a corporation of Ohio
Filed July 11, 1960, Ser. No. 41,975
18 Claims. (Cl. 324—61)

This invention relates generally to methods and apparatus for measurement of dielectric materials and more particularly to capacitance measurements for determining a plurality of properties, such as the weight of material and the moisture content thereof, of a material forming a portion of the dielectric in a capacitor.

Many systems have been provided in the past for measuring the dielectric properties of a material by means of a capacitor gauge for the purpose of determining the quantity of material present, the moisture content of the material, or the kind of material present as identified by the dielectric constant of a particular material. In such measurements it is conventional to arrange a bridge circuit in which at least one arm of the bridge includes a capacitor the structure of which is arranged to accept the material to be measured as the dielectric between the electrodes of the capacitor. The measurement which is conducted results in an electrical signal indicating a degree of unbalance of the bridge circuit due to a change in the characteristics of the material forming the dielectric of the measuring capacitor. Obviously, this electrical signal will be influenced by any change in the characteristics of the dielectric material in the measuring capacitor which result in a change in impedance of the capacitor and hence a change in the output signal derived from the bridge. Thus in the past considerable effort has been exerted where weight of material is being measured in attempting to eliminate the effect of moisture content on the measurement of the weight of material passing between the plates of the measurement capacitor. In other situations where it is desired to measure or control moisture content, it has been necessary to provide a correction for variation in weight of the material passing through the measuring capacitor in order that the control of the moisture content may not be influenced by weight variations. Where the material being measured is a mixture of different materials having unlike electric properties the measurement of the effective impedance change in the measuring capacitance will likewise reflect the combined effect of the mixture of materials. A specific example of a mixture of materials would be the measurement of the combined effect of the weight of a homogeneous material and its relative water content. While prior art systems have been satisfactory in certain applications they have serious limitations in high speed industrial processes where it is desired accurately to control two variables, such as weight and water content, both of which influence the electrical signal obtained from a capacitance type gauge.

It is accordingly the primary object of the present invention to provide a new and improved dielectric measuring system which is capable of detecting independent properties of a dielectric material even where these properties mutually influence the dielectric measurement.

A further object of the invention is to provide an improved dielectric gauge measurement system which develops two relations relating two variables of the material and provides a simultaneous solution for the two independent variables.

Another object of the invention is to provide a dielectric gauge which operates simultaneously at a plurality of measurement frequencies in order to obtain separate frequency signals related to the variables of the dielectric material which can be processed to extract the measure of the independent variables.

A still further and more specific object of the invention is to provide an improved dielectric gauge for a continuous process such as the production of a cigarette rod in which the measurement made can be utilized to derive the weight and moisture content of the rod in order that these variables may be employed accurately to control the cigarette making process.

Another object of the invention is to provide novel computer circuits for utilizing the signals obtained from a dual frequency dielectric gauge.

These other objects of the invention will be apparent from the following detailed description taken in conjunction with the accompanying drawings wherein.

In accordance with the present invention the dielectric measurements are made with a capacitance bridge which is energized with two distinct frequencies and the separate frequency signals are processed in accordance with relations between the signals and the independent variables from which they derive to obtain the measurement of the independent variables.

Figure 1:
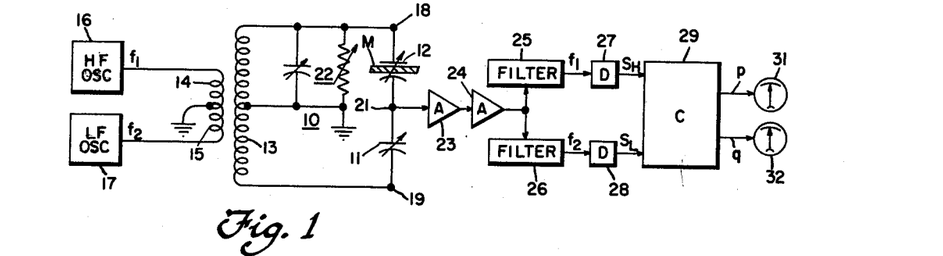
FIG. 1 is a block diagram of a measuring system in accordance with the invention.

Referring now to FIG. 1 a preferred embodiment of the system of the present invention comprises a bridge 10 made up of a capacitor 11 and a capacitive probe 12 which will be described in detail hereinafter. The capacitor 12 is adapted to include as a dielectric material M the substance to be measured or controlled in the industrial process. The bridge 10 has inductive arms formed by the two halves of a secondary winding 13 the center tap of which is grounded. The bridge formed by the capacitors 11 and 12 and the two portions of the winding 13 is energized from primary windings 14 and 15 which are supplied with separate frequencies $f_1$ and $f_2$ respectively from oscillators 16 and 17. With this arrangement the capacitive arms of the bridge have applied at terminals 18 and 19 balanced voltages at the frequencies of oscillators 16, 17 to produce an output terminal 21 signals at the frequencies $f_1$ and $f_2$ which vary in magnitude in accordance with the unbalance of the bridge 10 at each frequency. For the purpose of obtaining an initial balance a capacitance and resistance 22 may be required across one inductive arm of the bridge 10 for the purpose of providing a phase adjustment at the higher frequency.

The unbalanced signals at the frequencies $f_1$ and $f_2$ are amplified in a preamplifier 23 and an amplifier 24 from which they are applied to filters 25 and 26. The filter 25 is adapted to select the signal at frequency $f_1$ and pass it to a detector 27 the output of which is a D.C. signal $S_H$ the magnitude of which varies in accordance with the amplitude of the signal at frequency $f_1$ appearing at terminal 21. In similar manner the output of amplifier 24 is applied to a filter 26 which selectively passes signals of frequency $f_2$ to a detector 28 which produces at its output a signal $S_L$ which is a D.C. signal varying in amplitude according to the amplitude of the signal at terminal 21 of frequency $f_2$. In accordance with the present invention the signals $S_H$ and $S_L$ derived from the detectors 27, 28 are applied to a computer 29 which is effective to determine the weight of quantity of material present in the capacitor 12 on an indicator 31 and the moisture content in that material indicated on a meter 32. In accordance with well known control practice the signals applied to the indicators 31, 32 may also be utilized for automatic control of the material being measured by means well known in the art.

Figures 2, 6, 7:
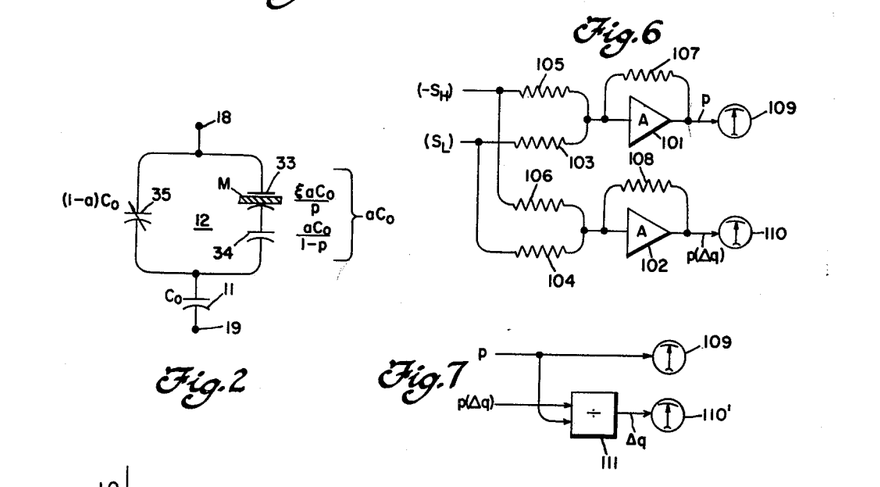
FIG. 2 is a schematic diagram of the equivalent circuit of the capacitance components present in the dielectric gauge of the disclosed embodiment.
FIG. 6 is a schematic diagram of a linear computer useful in the system of FIG. 1.
FIG. 7 is a block diagram representing a modification of the computer of FIG. 6.

Referring now to FIG. 2 the capacitor 11 and the capacitor 12 are represented as an equivalent circuit. The capacitor 11 has a capacitance value of $C_0$ while the capacitor 12 includes three components which have a combined value of $C_0$ with no dielectric present. The capacitor 12 includes an inactive stray and shunt capacitor 35 and an active capacitor 33, 34 which is adapted to receive the dielectric material.

If the active capacitor 33, 34 is the fractional part "$a$" of the total capacitance of capacitor 12 then the remaining or inactive capacitance is $(1-a)$ times the capacitance of capacitor 12. Thus the capacitance of capacitor 35 is $(1-a)C_0$ and the capacitance of capacitors 33 and 34 in series is $aC_0$. The quantity, $a$, therefore the fraction which defines that portion of the capacitor 12 which contains the material M.

The active capacitance $aC_0$ is made up effectively of two series capacitors 33 and 34 whenever the dielectric material M is present in the gauge.

Part $p$ of this active capacitor will be filled with the dielectric material M, having a dielectric constant $\epsilon$. This part 33 has a capacitance of $$\frac{\epsilon a C_0}{p}$$

while the remainder 34 having air dielectric has a capacitance of $$\frac{a C_0}{1-p}$$

This quantity p which may be called the filling factor relates the volume of the material present to the volume of the active part of the gauge capacitor 12:

$$p = \frac{\text{volume of material}}{\text{volume of gauge}} = \frac{Vm}{Vg}$$

The weight, W, of material present is related to $Vm$ by the density of the material $\rho m$:

$$W = \rho m V m$$

hence $$W = \rho m p V g$$

The weight of the material in the gauge is, therefore, directly proportional to $p$ providing $\rho m$ is constant. The fraction $p$ therefore is the filling factor for the active part of the gauge capacitor.

The series capacitance of the capacitors 33 and 34 for air dielectric is of course $aC_0$. Since the capacitance bridge 10 is to be in balance for no material present in the gauge, the capacitance of capacitor 11 is adjusted to be equal to the total capacitance of capacitors 33 and 34 and shunt capacitance 35 with no material present in the gauge. In the above notation the term $p$ may be called the filling factor of the gauge which determines the relative values of equivalent capacitors 33 and 34.

With no dielectric present the capacitance of capacitors 33 and 34 between terminals 18 and 19 is $aC_0$. With a dielectric material partially filling the capacitor 12, however, the capacitance is given by $$\frac{\epsilon a C_0}{(1-p)\epsilon + p}$$

The voltage output at terminal 21 can be written in terms of the voltages $+E$ and $-E$ applied with respect to ground to the terminals 18 and 19 respectively. The output voltage $E_0$ at terminal 21 is $$E_0 = -E + E \frac{2C_s}{C_0} \qquad (1)$$

where $C_s$ is the total capacitance between terminals 18 and 19. If we express $C_s$ in terms of $C_0$, $p$ and $a$ we obtain:

$$\frac{1}{C_s} = \frac{1}{C_0} + \frac{1}{(1-a)C_0 + \frac{\epsilon a C_0}{(1-p)\epsilon + p}} \qquad (3)$$

Reducing 3 and substituting into (1) we obtain:

$$E_0 = E \frac{\epsilon - P\epsilon + p - a\epsilon + p\epsilon a - pa + \epsilon a}{\epsilon(1-p) + p - pa\frac{(1-\epsilon)}{2}} \qquad (4)$$

Further reducing Equation 4, we obtain:

$$E_0 = \frac{E}{2} \frac{pa\left(1 - \frac{1}{\epsilon}\right)}{1 - p + \frac{p}{\epsilon} + \frac{ap}{2} - \frac{ap}{2\epsilon}} \qquad (5)$$

Equation 5 can be reduced for small values of $p$ and $a$ to the approximation:

$$E_0 = \frac{E}{2} pa\left(1 - \frac{1}{\epsilon}\right) \qquad (6)$$

For high values of $\epsilon$, which for a material like tobacco corresponds to a high moisture content, the output voltage can be approximated by:

$$E_0 = \frac{E}{2} \frac{pa}{1-p} \qquad (7)$$

Two conclusions may be drawn from Equations 6 and 7. For small values of the filling factor $p$, the output voltage can be considered as proportional to the filling factor $p$, as evidenced by Equation 6. For high values of $\epsilon$ which corresponds to a high moisture content in tobacco the output voltage is approximately given by Equation 7 and at these high moisture contents the function is substantially independent of variation in the moisture content.

In order to apply the invention to a particular measurement problem of a continuous industrial process it is necessary to determine the Relation 6 for the particular materials employed in the process which is to be monitored. As a specific example of utilizing the present invention, the following description of the invention applied to the measurement of a cigarette rod as it is being manufactured will be given.

Figure 3:
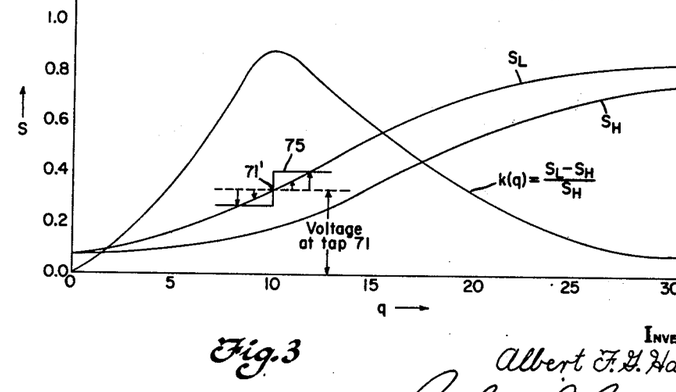
FIG. 3 is a set of curves relating the variables involved in the apparatus of FIG. 1 for measurement of a tobacco-water mixture.

Referring to FIG. 3 a set of curves $S_L$ and $S_H$ relate the signal derived in accordance with the invention at two different frequencies as a function of the percent by weight moisture content $q$ of the tobacco formed into a cigarette rod. The curve labeled $S_L$ in FIG. 3 was obtained with the circuit of FIG. 1 operating oscillator 17 at a frequency of 50 kilocycles. The curve identified as $S_H$ in FIG. 3 was obtained with the apparatus of FIG. 1 having oscillator 16 operating at a frequency of three megacycles. The shape of the curves $S_L$ and $S_H$ correspond with the functional relation given by Equation 6 for $\epsilon$ varying from unity up to relatively high values. This range of $\epsilon$ is obtained for moisture content variation in tobacco from very low moisture content up to about 30% moisture content. As can be seen the two curves $S_L$ and $S_H$ provide two functions corresponding to two equations from which the two unknowns moisture content $q$ and filling factor $p$ will be derived. In order to facilitate the computation in computer 29 a derived function $$\frac{S_L - S_H}{S_H}$$

is also plotted in FIG. 3.

Figure 4:
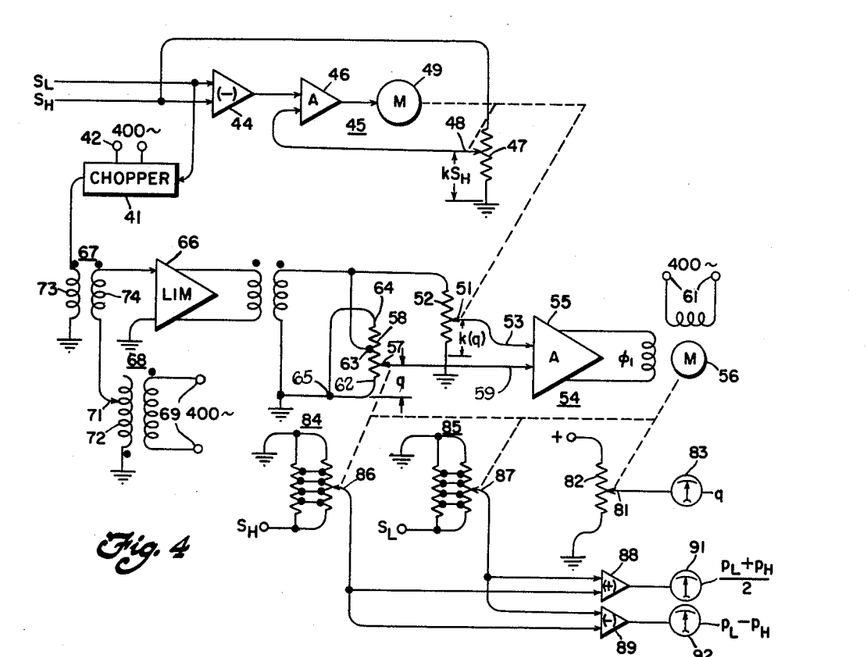
FIG. 4 is a block diagram partly schematic of an analog computer useful in the system of FIG. 1.

One form of computer for manipulating the functional relations obtained at the two frequencies in the circuit of FIG. 1 is shown in FIG. 4. For the purpose of operating the computer of FIG. 4 the high and low frequency signals derived from the bridge circuit of FIG. 1 can be approximated as follows:

$$S_L = B_L p f_L(q) \quad (8)$$
$$S_H = B_H p f_H(q) \quad (9)$$

where $q$ is the moisture content in percent and $$f(q) = \frac{1}{1-(\epsilon)}$$

In Equations 8 and 9 the subscripts L and H respectively refer to the functional relation between the D.C. signals $S_L$ and $S_H$ and the filling factor $p$ and moisture content functions $f_L(q)$ and $f_H(q)$ at the low and high frequencies of operation of the circuit of FIG. 1. The factors $B_L$ and $B_H$ are constants of proportionality. With $B_L$ and $B_H$ constant the following relation can be formed which is a function that eliminates the filling factor $p$:

$$k(q) = \frac{S_L - S_H}{S_H} = \frac{f_L(q) - f_H(q)}{f_H(q)} \quad (10)$$

As can be seen from FIG. 3 the function $k(q)$ starts at zero goes to a maximum and gradually returns to zero as the moisture content $q$ increases from zero to values in the neighborhood of 30%. To obtain the value of $q$ from the Relation 10 it is necessary to compute $k(q)$ and apply the value of $k(q)$ to a device which relates $k(q)$ and $q$.

A computer shown in FIG. 4 for performing the desired operations has input signals $S_L$ and $S_H$ applied to a subtraction circuit 44 which produces an output difference signal as one input to an implicit function computer 45. The implicit function computer 45 solves the equation:

$$(S_L - S_H) - kS_H = 0 \quad (11)$$

The computer 45 which solves (11) includes an amplifier 46 having two inputs one of which is $S_L - S_H$ and the other of which is $kS_H$. The quantity $S_L - S_H$ is obtained from the subtraction circuit 44 and the quantity $kS_H$ is obtained from a movable contact 48 of a potentiometer 47. The potentiometer 47 is supplied with the signal $S_H$ so that the fractional position $k$ of the contact 48 provides the signal $kS_H$. The two inputs to the amplifier 46 produce an output signal for any difference between the inputs and this output signal is applied to a motor 49 which runs in accordance with the sense of the difference between the input signals $S_L - S_H$ and $kS_H$. The motor 49 is coupled to move the contact 48 in a direction to reduce the difference between the quantities $kS_H$ and $S_L - S_H$ and the motor 49 will stop when this difference is zero. This condition corresponds to a solution for (11). Thus the conditions for solving Equation 11 are established and the mechanical position of the contact 48 is proportional to $k$. Rearranging (11) we obtain:

$$k = k(q) = \frac{S_L - S_H}{S_H} \quad (11')$$

Mechanically coupled with the movable contact 48 driven by motor 49 is a movable contact 51 on a potentiometer 52 which has applied thereto a constant magnitude 400 cycle voltage derived in a manner to be hereinafter described. Since the position of the movable contact 51 is proportional to $k$ and the voltage applied to the potentiometer 52 is constant the voltage at the contact 51 may be taken as an analog representation of the quantity $k(q)$. This voltage is applied at an input 53 of a second implicit function computer 54. The computer 54 comprises an amplifier 55 which drives a two phase motor 56 which operates a movable contact 57 on a specially wound potentiometer 58. The voltage at the movable contact 57 supplies a second input 59 to the amplifier 55. The second phase of the motor 56 is supplied with invariant phase from 400 cycle supply terminals 61.

The potentiometer 58 has a resistance variation corresponding to the function $k(q)$ shown in FIG. 3 such that when contact 57 is at end terminal 62 the voltage on contact 57 is zero and as contact 57 proceeds in an upward direction as shown in FIG. 4 the voltage on the contact 57 increases as the function $k(q)$ shown in FIG. 3. At intermediate terminal 63 the movable contact 57 will have obtained the maximum potential existing on the potentiometer 58 corresponding to the peak value of the function $k(q)$. As contact 57 proceeds in the upward direction toward terminal 64 the voltage of movable contact 57 will decrease toward zero in accordance with the falling portion of the function $k(q)$ corresponding to values of $q$ of 10 to 30%. The potentiometer 58 is energized by connecting to terminals 63 and 62 the constant magnitude 400 cycle voltage applied to potentiometer 52. The terminals 62 and 64 of potentiometer 58 are joined by a short circuiting connection 65 to be at the same potential.

The constant magnitude A.C. potential supplying potentiometers 52 and 58 is derived from a constant voltage network 66 which may be a limiting amplifier operating in response to the composite input signal obtained from a transformer 67 and an adjustable transformer 68. The transformer 68 is supplied with constant A.C. voltage at primary terminals 69 and an adjustable portion of this voltage with reversed phase is selected by a movable tap 71 on secondary 72. The transformer 67 comprises a primary 73 and a secondary 74 arranged to supply an A.C. signal proportional to $S_L$ to the winding 74 without phase reversal. This A.C. signal proportional to $S_L$ is obtained from a chopper 41 which is supplied with an input signal $S_L$ and is operated synchronously from the 400 cycle supply input at terminal 42. The amplifier 66 thus operates in accordance with the difference between the magnitude of the A.C. $S_L$ signal and the magnitude of the constant A.C. signal established by the position of the tap 71. With this arrangement when the A.C. signal $S_L$ is less in magnitude than the voltage at tap 71 the reverse phase voltage from tap 71 will predominate and the output of the limiting amplifier 66 will be of opposite phase to that which would obtain from the application of the A.C. analog of $S_L$ alone. When the magnitude of the A.C. $S_L$ analog exceeds that voltage on tap 71 the output voltage of the limiter reverses from that just described and produces an output phase corresponding to that which the A.C. analog of $S_L$ alone would provide. The amplifier 66 may be arranged with sufficiently high gain and constant amplitude regulation so that the phase reversal occurs substantially instantaneously with respect to the setting of the tap 71 without the usual S curve characteristic for phase determining circuits of this type. This operation is indicated in FIG. 3 by the square discriminator characteristic 75 which operates about the point 71' established by the voltage at the tap 71.

The operation of the computer FIG. 4 will now be described. As previously set forth the position of the tap 51 of potentiometer 52 is proportional to the value of $k(q)$ and a voltage proportional to this tap position is applied to one input 53 to the amplifier 55. This input will operate the motor 56, assuming that tap 57 starts at terminal 62, until the voltage at tap 57, and hence input 59, equals the voltage at input 53 at which time the output of the amplifier 55 will fall to zero and the motor 56 will stop. The position at which tap 57 stops will be proportional to $q$ since by definition the null voltage at tap 57 must equal $k(q)$ and the potentiometer 58 is so wound that displacement along the winding by values of $q$ will produce voltages equal to the function $k(q)$. It will be observed that the function $k(q)$ as shown in FIG. 3 starts at zero, goes to a maximum near the value of $q$ of 10% and decreases again toward zero for higher values of $q$. This ratio $k$ as computed by the computer 45 may be interpreted physically as an excursion of the movable contact 48 from the bottom or ground terminal of the potentiometer 47 up to a maximum point corresponding to the maximum position of the function $k(q)$ and then a reversal in direction back toward the ground terminal of potentiometer 47. For this motion the linear wound potentiometer 52 generates the function $k(q)$ at the movable contact 51 ganged with contact 48. During the initial rise of the contact 51 the contact 57 rises also until at the peak value of the function $k(q)$ when the contact 51 is at its uppermost point the contact 57 will be at the terminal 63 of potentiometer 58. At this point also the amplifier 66 will be stable at one phase or the other depending upon which side of the unstable point 71' in FIG. 3 the system comes to rest. For further increases in the value of $S_L$ and $S_H$ due to rise of moisture content $q$ the function $k(q)$ will decrease. In order for the position of tap 57 to represent the quantity $q$ however the movable contact 57 must proceed in the same direction it moved in moving from terminal 62 to terminal 63. This is accomplished by the phase reversal obtained from the amplifier 66 which supplies the potentiometers 52 and 58 and occurs when the A.C. quantity $S_L$ exceeds the A.C. voltage set at tap 71 corresponding to the peak voltage value of $k(q)$ which is obtained at terminal 63. Due to this phase reversal the contact 57 for increasing values of $q$ will proceed as shown in FIG. 4 toward terminal 64. Since the winding of potentiometer 58 corresponds with the function $k(q)$ on both sides of the peak value (terminal 63), the mechanical location of the contact 57 will always be proportional to $q$.

Figure 5:
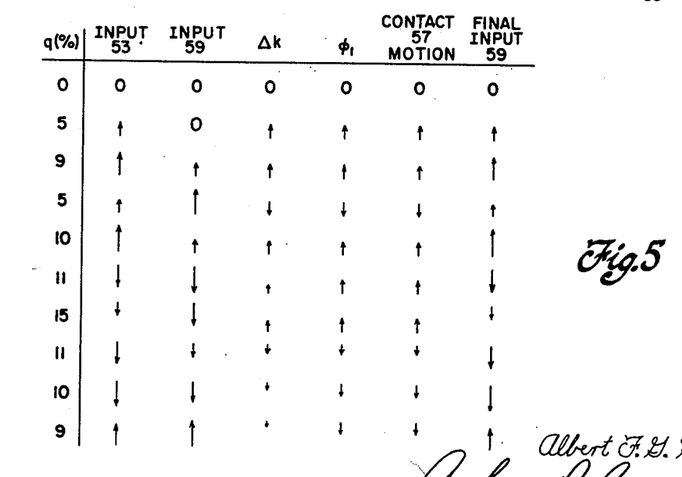
FIG. 5 is a phase diagram useful in understanding the operation of the circuit of FIG. 4.

The foregoing operation may be more clearly understood by reference to FIG. 5 in which various A.C. voltages and phases are shown for different values of percent moisture $q$. The assumed values of $q$ in percent moisture are given in the left hand column and the succeeding columns show the inputs to terminals 53 and 59 of the amplifier 55 and the incremental signal $\Delta k$ resulting from the difference between the input 53 and the input 59. The quantity $\phi_1$ is the phase applied to the motor 56 as a result of the signal $\Delta k$, which determines the direction of motion of the potentiometer contact 57. The final column is the voltage at input terminal 59 resulting from a completion of the motion of contact 57 which reduces $\Delta k$ to zero. Starting at the top row with $q$ equal to zero all of the inputs are represented as zeros. In the second row if $q$ increases to 5 percent the input 53 corresponding to the motion of contact 51 increases, the input 59 remaining as zero prior to motion of contact 57. The difference between the inputs 53 and 59 is given as an upward directed arrow representing the phase which when applied to the $\phi_1$ input to the motor 56 results in the motion of contact 57 in the upward direction as indicated in the next to the last column of row two. This motion results in the final input of 59 being the same as the initial input to 53. The third row corresponding to a $q$ equal to 9% shows a similar action as the input 53 is increased and ultimately the input 59 is increased to the same value. If now $q$ should be reduced to 5 percent as shown in the fourth row the input 53 would decrease making the differential between the existing inputs at 53 and 59 a reversed phase $\Delta k$ and hence reversed phase $\phi_1$ resulting in a downward motion of the contact 57 to reduce the final input 59 to correspond to the input 53. An increase of $q$ to 10 percent produces the corresponding action described for inputs of 5 and 9 percent. As the moisture content $q$ increases past the peak value of $k(q)$, however, as indicated at the value of $q$ at 11 percent, the phase reversal effected by the limiting amplifier 66 reverses the phase of input 53 and its magnitude is slightly reduced by the amount that the function moves past the peak value. The input 59 is likewise reversed since the supply voltage to the potentiometer 58 reverses with the reversal of this supply to the potentiometer 52. The difference between the reversed phases at input 53 and 59 is however an upward phased $\Delta k$ producing at the output of amplifier 55 an upward phase $\phi_1$ resulting in motion of the contact 57 in the upward direction beyond the contact 63. This action reduces the reversed phase input at input 59 to equal the reversed phase at input 53 as shown in the right column for $q$ at a value of 11 percent. Further increase in the value of $q$ at 15 percent produces the changes as shown and a subsequent reduction of the value of $q$ to the neighborhood of 11 percent results in a return to the 11 percent values as shown. Thus it can be seen that the position of the tap 57 will truly represent the value of $q$ as defined by the function wound into potentiometer 58 with the capability of distinguishing between the multiple values of $k(q)$ obtained on opposite sides of the peak value. A decrease of $q$ through the peak value of $k(q)$ will result in a phase reversal to the original phase as shown in the bottom row in FIG. 5.

The position of the contact 57 representing $q$ can be utilized to indicate the value of $q$ and to obtain the value of the filling factor $p$. For this purpose the motor 56 is coupled to a movable contact 81 of a linear potentiometer 82 energized from a constant D.C. source and arranged to move over the predetermined range of the potentiometer 82 for the full range of travel of the contact 57 from terminal 62 to 64. Thus the voltage at movable contact 81 will be directly proportional to the variable $q$ and may be indicated on a suitably calibrated meter 83 or utilized for control purposes in any known manner.

The filling factor $p$ may be obtained from potentiometers 84 and 85 which are wound respectively in accordance with the functions $f_H(q)$ and $f_L(q)$ as given in Equations 8 and 9. With this taper of the resistance characteristics of the potentiometers 84 and 85 and with movable contacts 86 and 87 positioned in proportion to the value of $q$ by being operated by the motor 56 the voltage at the terminals 86 and 87 will be that fraction of the input voltage determined by the reciprocal of the functions $f_H(q)$ and $f_L(q)$. Accordingly if the voltage across potentiometer 84 is $S_H$ as indicated and the voltage across the potentiometer 85 is $S_L$ as indicated, the output voltage at terminal 86 will be proportional to the filling factor $p$, as determined by the high frequency measurement and the output voltage at terminal 87 will be proportional to the filling factor $p$ as determined by the low frequency measurement. By applying these two voltages to an adding device 88 an output voltage is obtained which is proportional to the sum of the values which after taking into account the constants of the system represents the average of the sum of $p_L$ and $p_H$. Since the filling factor $p$ should be independent of the method of measurement the application of the voltages from contact 86 and 87 to the difference circuit 89 will provide a measure of the deviation of the two values of $p$ for the high and low frequency measurement thereof. Accordingly, deviations of the output of the difference network 89 from zero will indicate that some error has occurred in the computer. The average value of the filling factor $p$ may be indicated on a suitably calibrated indicator 91 or applied for control purposes in any known fashion. The deviation corresponding to the difference in the two computed values of the packing fraction $p$ may be indicated on a suitable indicator 92.

The foregoing computer described in connection with FIG. 4 provides a substantially exact solution for the moisture content and filling factor quantities $q$ and $p$. In some applications a simplified linear computer may be used without introducing objectionable error. To analyze the requirements for a linear computer consider the following functions which are defined only within a narrow range around $q_0$:

$$S_L = pf_L(q)$$
$$S_H = pf_H(q) \qquad (12)$$

If the Functions 12 are expanded in Taylor's series around $q_0$, the change S in the functions will be given by:

$$\Delta S_L = pf_L'(q_0)\Delta q + \tfrac{1}{2} pf_L''(q_0)\Delta q^2$$
$$\Delta S_H = pf_H'(q_0)\Delta q + \tfrac{1}{2} pf_H''(q_0)\Delta q^2 \qquad (13)$$

We will now define a linear function $F(p)$ of the variables $S_L$ and $S_H$.

$$F(p) = f'_H(q_0)S_L - f'_L(q_0)S_H \qquad (14)$$

Substituting the respective Equations 12 in the Equation 14, factoring out the $p$ and expanding in Taylor's series produces:

$$F(p) = p[f'_H(q_0)f_L(q) - f'_L(q_0)f_H(q)]$$
$$= pf'_H(q_0)[f_L(q_0) + f'_L(q_0)\Delta q + \tfrac{1}{2}f''(q_0)\Delta q^2 + \ldots ]$$
$$- pf'_L(q_0)[f_H(q_0) + f'_H(q_0)$$
$$\Delta q + \tfrac{1}{2}f''(q_0)\Delta q^2 + \ldots ] \qquad (15)$$

Collecting terms and noticing that the terms in $\Delta q$ cancel we have:

$$F(p) = p[f'_H(q_0)f_L(q_0) - f'_L(q_0)f_H(q_0)] +$$
$$\frac{p}{2}[f'_H(q^0)f''_L(q_0) - f'_L(q_0)f''_H(q_0)]\Delta q^2 \qquad (16)$$

For small variations of $q$ around $q_0$ the higher ordered term in Equation 16 may be neglected without introducing error greater than that term. Neglecting the second term of (16) and dividing (16) into (14) we have:

$$1 = \frac{f'_H(q_0)S_L - f'_L(q_0)S_H}{p[f'_H(q_0)f_L(q_0) - f'_L(q_0)f_H(q_0)]} \qquad (17)$$

Equation 17 can be written as equation:

$$p = K_{11}S_L - K_{12}S_H \qquad (18)$$

since all of the functions $f_L$ and their derivatives are evaluated at $q_0$ and are therefore constants. Equation 18 is, therefore, a linear relation expressing the filling factor $p$ in terms of the two signals $S_L$ and $S_H$.

We now define a relation for the moisture content $q$ as follows:

$$G(q) = f_H(q_0) - S_L - f_L(q_0)S_H \qquad (19)$$

Substituting the respective Equations 12 for the values $S_L$ and $S_H$ and factoring out the $p$ term we have:

$$G(q) = p[f_H(q_0)f_L(q) - f_L(q)f_H(q)] \qquad (20)$$

Expanding the $f_L(q)$ and the $f_H(q)$ quantities in (20) in Taylor's series about $q_0$ we have:

$$G(q) = pf_H(q_0)[f_L(q_0) + f'(q_0)\Delta q$$
$$+ \tfrac{1}{2}f''(q_0)\Delta q^2 + \ldots ]$$
$$- pf_L(q_0)[f_H(q_0) + f'_H(q_0)\Delta q$$
$$+ \tfrac{1}{2}f''(q_0)\Delta q^2 + \ldots ] \qquad (21)$$

Combining terms and rearranging and noticing that the first terms in the bracket expressions of (21) cancel we have:

$$G(q) = p[f_H(q_0)f'_L(q_0) - f_L(q_0)f'_H(q_0)]\Delta q$$
$$+ \tfrac{1}{2}p[f_H(q_0)f''_L(q_0) - f_L(q_0)f''_H(q_0)]\Delta q^2 \qquad (22)$$

As an approximation for small values of $\Delta q$ the higher order $\Delta q$ terms can be neglected and we obtain by dividing (22) into (19):

$$1 = \frac{f_H(q_0)S_L - f_L(q_0)S_H}{p[f_H(q_0)f'_L(q_0) - f_L(q_0)f'_H(q_0)]\Delta q} \qquad (23)$$

Rearranging (23) we have:

$$\Delta q = \frac{K_{21}S_L - K_{22}S_H}{p} \qquad (24)$$

since again all functional values of $f(q)$ and derivatives thereof are evaluated to $q_0$ and hence constants. Thus we see from Equation 24 that $\Delta q$ is proportional to a linear function of the two signals $S_L$ and $S_H$ and inversely proportional the filling factor $p$. As a first approximation for small changes in the filling factor, (24) can be considered a linear relation between the value $\Delta q$ and the signal values $S_L$ and $S_H$.

A linear computer for solving simultaneously Equations 18 and 24 is shown in FIG. 6. The signal $S_L$ and the negative of the signal $S_H$ as previously derived in the circuit of FIG. 1 are applied as paired inputs to operational amplifiers 101 and 102. The signal $S_L$ is applied to the amplifier 101 through a resistor 103 having a value inversely proportional to the constant $K_{11}$. The signal $S_L$ is applied to the input of amplifier 102 through a resistor 104 having a value which is inversely proportional to the constant $K_{21}$. The negative of the signal $S_H$ is applied to the amplifier 101 through a resistor 105 having a value inversely proportional to the constant $K_{12}$ and to the amplifier 101 through a resistor 106 having a value inversely proportional to the constant $K_{22}$.

The operational amplifiers 101 and 102 are arranged with feed back resistors 107 and 108 in a manner well known to provide at the outputs thereof the solution of the sums of the input signals thereto as modified by the summing resistors 103, 105 and 104, 106 respectively. Accordingly the output of amplifier 101 is a quantity directly related to $p$ as given in Equation 18 and the filling factor may therefore be indicated on a suitable indicator 109 or the signal from amplifier 101 may be utilized for control purposes. The output of the amplifier 102 is the solution of the linear equation in the numerator of Equation 24 and hence is directly proportional to the quantity $p\Delta q$. For small changes in the quantity $p$ this output of amplifier 102 may be indicated on an indicator 110 as an approximation to the deviation $\Delta q$. The quantity applied to the indicator 110 may be also used for control purposes in any known manner.

In FIG. 7 a modification of the computer of FIG. 6 is indicated for obtaining an exact solution of the quantity $\Delta q$. The quantity $p$ from the output of amplifier 101 is applied to the indicator 109 or control device as hereinbefore stated. The quantity $p$ is also provided as the devisor in a dividing circuit 111 which has applied as the dividend for the division performed by the device 111 the quantity $p\Delta q$ as obtained from amplifier 102. The output of the dividing circuit 111 therefore is the quantity $\Delta q$ which may be applied to an indicator 110' or suitable control circuits.

Figure 8:
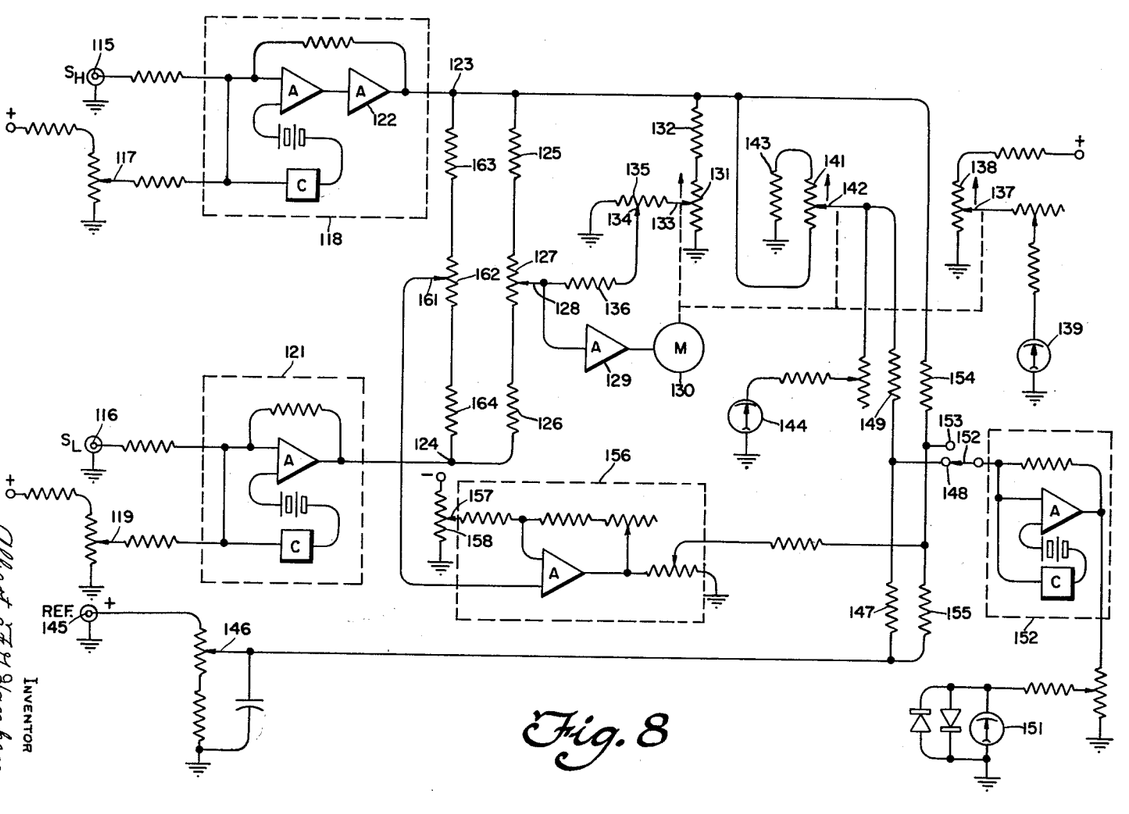
FIG. 8 is a schematic diagram of a linear servo computer combined with an alternative linear electronic computer.

Referring now to FIG. 8 a linear computer suitable for operating in the range from approximately zero to 10% of moisture content for the variable displayed in FIG. 3 will be described. It will be understood that the linear computer of FIG. 8 may be employed wherever the variables provide a suitable range of single valued signals which deviate from linear signals by no more than the amount which would produce unacceptable error in the final computed values of the quantities to be measured. The computer of FIG. 8 operates in response to an $S_H$ signal applied at terminal 115 and an $S_L$ signal applied at input terminal 116. The signal $S_H$ applied at terminal 115 is used with respect to an adjustable reference potential derived from potentiometer tap 117 to provide at the input of a chopper stabilizer amplifier 118 the signal $S_H$ varying relative to a fixed value. In similar fashion the $S_L$ signal at terminal 116 is referenced to an adjustable potential obtained at potentiometer tap 119 to provide an input signal for a chopper stabilized amplifier 121. The chopper stabilized amplifiers 118 and 121 may be any conventional type providing amplification of D.C. signals with high stability. The amplifier 118 includes an additional inverting stage 122 in order that the output signal at terminal 123 of amplifier 118 will be opposite in polarity to the signal at output terminal 124 from amplifier 121.

The opposite polarity D.C. signals at terminals 123 and 124 are applied across a first resistor voltage divider comprising fixed resistors 125 and 126 connected to a potentiometer 127. The potentiometer 127 has an adjustable contact 128 which supplies the input signal to a servo amplifier 129 of a followup servo system which includes amplifier 129 and a motor 130 operated thereby. The nulling voltage for the servo system is obtained from a potentiometer 131 connected through resistor 132 to the $S_H$ D.C. signal at terminal 123. A portion of the voltage from terminal 123 which appears at tap 133 is applied in adjustable magnitude from a tap 134 of potentiometer 135 through resistor 136 to the input of servo amplifier 129. The system as thus far described in FIG. 8 corresponds generally with the portion of FIG. 4 providing for the positioning of tap 48 on potentiometer 47. In the system of FIG. 8 to the extent that the range of operation is linear about the selected mid-point the servo system comprising amplifier 129 and motor 130 will adjust the movable contact 133 an amount proportional to the changes in percent moisture content $q$. Accordingly the motor 130 may be arranged to operate contact 137 of a potentiometer 138 which is connected to a constant potential supply to provide a voltage proportional to $q$. The voltage at contact 137 is applied to a suitable meter 139 calibrated directly in percent moisture.

The filling factor $p$, which is proportional to the weight of the material being measured may be obtained from a potentiometer 141 having a movable contact 142 operated by the servo motor 130. The potentiometer 141 is connected to terminal 123 and through a resistor 143 to ground. It will be noted that the potentiometer 141 is reversely connected between terminal 123 and ground wtih respect to the direction of motion of the movable contact 142 when compared to the connection of potentiometer 131 and the direction of motion of its movable contact 133 also driven by motor 130. This connection is required and is analagous to that shown in FIG. 4 for the derivation of the signals proportional to the quantity $p$ since $p$ varies inversely as the quantity $q$ and directly as the quantity $S_H$ appearing at terminal 123. The signal at movable contact 142 may therefore be applied to a suitably calibrated meter 144 to indicate the weight of the material being measured.

Since the operation of the computer FIG. 8 will be with respect to an operating point representing the design specification for the process material (i.e. the desired weight of a cigarette rod) it is helpful to present information showing deviation from the design specification. For this purpose a circuit is provided which operates with respect to a reference potential applied at terminal 145. The signal applied at terminal 145 is derived from the bridge circuit of FIG. 1 and represents the magnitude of the high frequency signal applied from oscillator 16. The magnitude of the high frequency signal is rectified and provides at terminal 145 a D.C. level representing the reference magnitude from which the signal at terminal 123 is derived. Accordingly when utilized as hereinafter described fluctuations in the level of the high frequency oscillations from oscillator 16 do not alter the output of the system.

The reference potential at terminal 145 is adjustably selected by movable contact 146 and applied through an isolating resistor 147 to a servo output terminal 148. The signal proportional to weight at movable contact 142 is also applied through an isolating resistor 149 to the servo output terminal 148. By suitably adjusting the position of contact 146 the reference signal applied at terminal 148 may be made equal and opposite to that applied from terminal 142 when the cigarette rod or other material being measured in the process is exactly at the specification weight. For this condition the signal at terminal 148 will be zero and when applied to a zero center meter 151 through a suitable chopper stabilized D.C. amplifier 152 will produce a high sensitivity indication of the deviation of the product from the design specification value. The increased sensitivity provided by amplifier 152 and the elimination of the effects of variations in magnitude of the high frequency signal obtained by means of the reference potential applied at terminal 145 permit the meter 151 to operate with high sensitivity and indicate both positive and negative deviations from the design center. The meter 151 is calibrated directly in percent deviation and with a zero center movement indicates deviation either above or below the design value of the product.

A deviation indication on meter 151 which is derived by all electronic means may be obtained with the circuit of FIG. 8 by changing switch 152 to contact 153. The contact 153 is connected to the mid-point of a resistance voltage divider comprising resistors 154 and 155 connected between terminal 123 and the movable contact 146. Accordingly the normal potential at terminal 153 is adjusted to be zero for a standard product in the measurement gauge. Also applied to terminal 153 is the output of an operational amplifier 156 similar to amplifier 101 shown in FIG. 6. The inputs to amplifier 156 are an adjustable reference voltage obtained at movable contact 157 of a potentiometer 158 and the potential from a movable contact 161 obtained from a potentiometer 162 which is connected through equal value resistors 163 and 164 to the terminals 123 and 124. The contacts 157 and 161 are thus adjusted to produce a zero output signal from the amplifier 156 for a standard product in the measurement gauge and thus the potential at contact 153 remains undisturbed for the product as long as it conforms to the specification therefor. Variations in the weight of the product, however, produce a change in the potential at contact 161 which is applied as an input to the amplifier 156 to produce an output proportional to the weight change and thus indicates the same on meter 151 when switch 152 is in contact 153 position.

While the foregoing computational arrangements have been derived on the basis of computing the filling factor $p$, it will be apparent from the manner in which this quantity was defined that it is directly proportional to the weight of the material in process since the process involves a stream the cross-section of which is a known geometrical shape and in general will not vary. Accordingly the filling factor represents the density to which the cross-section has been filled and for a known cross-section will be directly proportional to the weight per unit length of the material going into the product.

While specific embodiments of approximate and exact computation schemes have been disclosed in the present application, it will be understood that the invention is not limited to such computational arrangements but may be broadly applied and utilized with other computers for obtaining the simultaneous solution of two equations to obtain the values of two unknowns. Other modifications in the arrangements disclosed will be apparent to those skilled in the art and are to be considered within the scope of the invention as defined in the appended claims.

What is claimed is:

1. A system for measuring the weight and moisture content of a material comprising a measurement head having two spaced electrodes of a measurement capacitor adapted to have said material pass adjacent said two spaced electrodes to form a portion of the dielectric of said measurement capacitor, means for simultaneously applying two separate frequencies to said capacitor, means for detecting the signal across said capacitor at each of said frequencies, and measuring means for combining the detected signals to obtain a measurement proportional to the weight of said material and a measurement proportional to the relative moisture content of said material.

2. A system for measuring the weight and moisture content of a traveling material comprising measurement capacitor means adapted for having said material continuously passed adjacent said capacitor means as a dielectric thereof, means for applying electromagnetic fields of two distinct frequencies to said material in said capacitor means, means in circuit with said capacitor means for separately detecting each signal across said capacitor means, means for combining said signal values to obtain a difference signal which varies in magnitude as the relative value of the combined signals, an amplifier responsive to the difference between said difference signal and a null signal, means operated by said amplifier, a circuit having connected thereto one of said signals and operated by said last-named means to select a fractional portion of said one signal as said null signal, a second circuit having said one signal connected thereto and operated by said last named means to provide a voltage output, an indicator responsive to the voltage output of said second circuit to indicate the weight of said material.

3. A system for measuring the weight and moisture content of a traveling material comprising measurement capacitor means adapted for having said material passed adjacent said capacitor means as a dielectric thereof, means for applying electromagnetic fields of two distinct frequencies to said material in said capacitor means, means in circuit with said capacitor means for separately detecting each signal across said capacitor means, means for combining said signal values to obtain a difference signal which varies in magnitude as the relative value of the combined signals, an amplifier responsive to the difference between said difference signal and a null signal, means operated by said amplifier, a circuit having connected thereto one of said signals and operated by said last-named means to select a fractional portion of said one signal as said null signal, a second circuit having said one signal connected thereto and operated by said last named means to provide a voltage output, an indicator responsive to the voltage output of said second circuit to indicate the weight of said material, a third circuit connected across a constant voltage and to said last-named means, and an indicator responsive to the voltage output of said third circuit to indicate relative moisture content of said material.

4. A system for measuring the weight and moisture content of a traveling material comprising measurement capacitor means adapted for having said material passed adjacent said capacitor means as a dielectric thereof, means for applying electromagnetic fields of two distinct frequencies to said material in said capacitor means, means in circuit with said capacitor means for separately detecting each signal across said capacitor means, means for combining said signal values to obtain a difference signal which varies in magnitude as the relative value of the combined signals, a servo amplifier responsive to the difference between said difference signal and a null signal, a servomotor operated by said amplifier, a potentiometer connected across a voltage proportional to one of said signal values and operated by said servomotor to select a portion of said voltage as said null signal, a second potentiometer connected across said voltage and operated inversely by said servomotor, an indicator responsive to the voltage output of said second potentiometer to indicate the weight of said material.

5. A system for measuring the weight and moisture content of a traveling material comprising measurement capacitor means adapted for having said material passed adjacent said capacitor means as a dielectric thereof, means for applying electromagnetic fields of two distinct frequencies to said material in said capacitor means, means in circuit with said capacitor means for separately detecting each signal across said capacitor means, means for combining said signal values to obtain a difference signal which varies in magnitude as the relative value of the combined signals, a servo amplifier responsive to the difference between said difference signal and a null signal, a servomotor operated by said amplifier, a potentiometer connected across a voltage proportional to one of said signal values and operated by said servomotor to select a portion of said voltage as said null signal, a second potentiometer connected across said voltage and operated inversely by said servomotor to select a portion of said voltage, an indicator responsive to said voltage portion of said second potentiometer to indicate the weight of said material, a third potentiometer connected across a constant voltage and operated by said servomotor, and an indicator responsive to the voltage output of said third potentiometer to indicate relative moisture content of said material.

6. Apparatus according to claim 2 and including a reference voltage which varies in accordance with the magnitude of the voltage applied to said capacitor to produce one of said fields, means for producing a standard weight null voltage by balancing said reference voltage against the voltage from said second potentiometer for a standard weight cigarette rod in said capacitor means, and an indicator responsive to said standard weight null voltage for indicating deviations of weight of said rod above or below standard weight.

7. A system for measuring the weight and moisture content of a traveling material, comprising measurement capacitor means adapted to have said material continuously passed adjacent said capacitor means as a dielectric thereof, means for simultaneously applying high and low frequency electromangetic fields to said material in said capacitor means, means in circuit with said capacitor means for detecting a high frequency signal $S_H$ and a low frequency signal $S_L$ which vary in accordance with the variation in capacitance of said capacitor means at the respective frequency and means for combining $S_H$ and $S_L$ in accordance with the following equations to obtain $p$ and $\Delta q$:

$$p = K_{11}S_L - K_{12}S_H$$

$$\Delta q = \frac{1}{p}(K_{21}S_L - K_{22}S_H)$$

where $p$ is proportional to weight, $\Delta q$ is proportional to change in relative moisture content and $K_{11}$, $K_{12}$, $K_{21}$, $K_{22}$ are constants evaluated for conditions of standard weight and moisture content of said material.

8. Apparatus according to claim 7 wherein said means for combining said signals consists of first and second operational amplifiers each having two input signals of opposite polarity proportional to $S_H$ and $S_L$ and combined to produce outputs proportional to $p$ and $p\Delta q$ respectively.

9. Apparatus according to claim 8 and including dividing means having dividend and divisor input and a quotient output, means for applying said output proportional to $p\Delta q$ to said dividend input, means for applying said output proportional to $p$ to said divisor input and utlization means coupled to said quotient output.

10. A system for measuring a material comprising two constituents having different dielectric characteristics, said system comprising measurement capacitor means adapted for having said material passed adjacent said capacitor means as a dielectric thereof, means for applying electromagnetic fields of two distinct frequencies to said material in said capacitor means, means in circuit with said capacitor means for separately detecting each signal across said capacitor means, a subtractor circuit supplied with said signal values for producing a difference signal, a first potentiometer connected across a voltage proportional to one of said signal values, a differential amplifier, means connecting said difference signal and the voltage at the movable tap of said potentiometer to the inputs of said differential amplifier, a first motor driven by the output of said differential amplifier, second and third potentiometers each having the same constant voltage thereacross and said third potentiometer being wound in accordance with the function $$\frac{S_L - S_H}{S_H}$$

where $S_L$ and $S_H$ are said signal values at the low and high frequency respectively, a second motor for operating the tap of said third potentiometer, means coupling said first motor to drive the tap of said first and second potentiometers, a second differential amplifier having inputs from the taps of said second and third potentiometers and an output driving said third potentiometer and separate potentiometer means driven by said second motor for producing voltage values proportional to the relative amount of said constituents.

11. Apparatus for quantitative determination of the mass of a dielectric material made up of more than one constituent, said apparatus comprising a plurality of sources of electrical signals at different respective frequencies, detecting means, and capacitive probe means coupled to said sources and having spaced electrodes arranged for applying electrical signals from said sources to at least a portion of said material and coupling said detecting means to said portion, said detecting means including means for deriving separate signals each resulting from the signals applied to said portion from a respective source as these applied signals are influenced by the mass of said material and the dielectric properties of said material at the frequency of that source, and means for combining said separate signals to produce a continuous resultant signal indicative of the mass of said dielectric material substantially independent of the relative amount of at least one of said constituents.

12. Apparatus for quantitative determination of the mass of a dielectric material having a variable moisture content, said apparatus comprising a plurality of sources of electrical signals at different respective frequencies, detecting means, and capacitive probe means coupled to said sources and having spaced electrodes arranged for applying electrical signals from said sources to at least a portion of said material and coupling said detecting means to said portion, said detecting means including means for deriving separate signals each resulting from the signals applied to said portion from a respective source as these applied signals are influenced by the mass of said material and the dielectric properties of said material at the frequency of that source, and means for combining said separate signals to produce a continuous resultant signal indicative of the mass of said dielectric material substantially independent of its moisture content.

13. Apparatus for quantitative determination of the mass and moisture content of a dielectric material, said apparatus comprising a plurality of sources of electrical signals at different respective frequencies, detecting means, and capacitive probe means coupled to said sources and having spaced electrodes arranged for applying electrical signals from said sources to at least a portion of said material and coupling said detecting means to said portion, said detecting means including means for deriving separate signals each resulting from the signals applied to said portion from a respective source as these applied signals are influenced by the mass of said material and the dielectric properties of said material at the frequency of that source, and means for combining said separate signals to produce two continuous resultant signals, one indicative of the mass of said dielectric material substantially independent of its moisture content and the other indicative of the moisture content of said material substantially independent of its mass.

14. A method for quantitatively determining the mass of a dielectric material under test made up of more than one constituent, said method comprising applying electrical signals at a plurality of different frequencies to at least a portion of the material under test, deriving separate output signals each indicative of the voltages developed between electrodes coupled together by a portion of said material to which said applied signals are applied at a respective frequency, and combining said separate signals to produce a continuous resultant signal that is indicative of the mass of said dielectric material substantially independent of the relative amount of at least one of said constituents.

15. A method for quantitatively determining the mass and moisture content of a dielectric material under test, said method comprising applying electrical signals at a plurality of different frequencies to at least a portion of the material under test, deriving separate output signals each indicative of the voltages developed between electrodes coupled together by a portion of said material to which said applied signals are applied at a respective frequency, and combining said separate signals to produce two continuous resultant signals, one indicative of the mass of said dielectric material substantially independent of its moisture content and the other indicative of the moisture content of said material substantially independent of its mass.

16. Apparatus for quantitative determination of the moisture content of a dielectric material made up of more than one constituent, said apparatus comprising a plurality of sources of electrical signals at different respective frequencies, detecting means, and capacitive probe means coupled to said sources and having spaced electrodes arranged for applying electrical signals from said sources to at least a portion of said material and coupling said detecting means to said portion, said detecting means including means for deriving separate signals each resulting from the signals applied to said portion from a respective source as these applied signals are influenced by the mass of said material and the dielectric properties of said material at the frequency of that source, and a servo motor system for comparing said separate signals to produce a continuous resultant signal indicative of the moisture content of said dielectric material substantially independent of its mass.

17. Apparatus for determining the mass and the moisture content of material under test comprising capacitive probe means having spaced electrodes for subjecting said material to an electromagnetic field, means for energizing said capacitive probe means with at least two different frequencies, and means responsive to signal increments across said capacitive probe means induced by said material at said different frequencies for producing two output measurements representative of mass and moisture content respectively, each of said output measurements being independent of variations in the variable represented by the other.

18. A system for quantitatively measuring two properties of a material comprising a measurement head having two spaced electrodes of a measurement capacitor for coupling to said material passing adjacent said measurement capacitor and forming at least a portion of the dielectric of said measurement capacitor, means for simultaneously applying signals at two separate frequencies to said capacitor, means for detecting the signal across said capacitor at each of said frequencies, and means for combining the detected signals with each other to obtain a measurement proportional to each of said two properties.

References Cited in the file of this patent

UNITED STATES PATENTS

| | | |
|---|---|---|
| 2,527,208 | Berry et al. | Oct. 24, 1950 |
| 2,592,101 | Aiken | Apr. 8, 1952 |
| 2,625,583 | Broding | Jan. 13, 1953 |
| 2,744,233 | Paivinen | May 1, 1956 |
| 2,920,206 | Heller | Jan. 5, 1960 |
| 2,920,272 | Erdman et al. | Jan. 5, 1960 |

FOREIGN PATENTS

| | | |
|---|---|---|
| 710,974 | Germany | Sept. 24, 1941 |
| 583,981 | Great Britain | Jan. 3, 1947 |
| 622,470 | Great Britain | May 3, 1949 |
| 744,311 | Great Britain | Feb. 1, 1956 |
| 217,898 | Australia | Oct. 21, 1958 |

OTHER REFERENCES

Oathey et al.: Bridge With Coupled Inductive Ratio Arms as Precision Instruments for the Comparison of Laboratory Standards of Resistance or Capacitance, Proc. of IEEE, part III, Radio Engineering, vol. 101, No. 70, March 1954, pp. 91–100.

Clavert: The Transformer Ratio-Arm Bridge, Wayne Kerr Monograph No. 1, received in the U.S. Patent Office August 7, 1958.